United States Patent [19]
Otake

[11] Patent Number: 5,876,876
[45] Date of Patent: Mar. 2, 1999

[54] CONTROL NEGATIVE FOR USE IN SETTING UP EXPOSURE CONDITION OF PHOTO-PRINTER

[75] Inventor: Katsumi Otake, Tokyo, Japan

[73] Assignee: Fuji Photo Film Co., Ltd., Kanagawa, Japan

[21] Appl. No.: 676,084

[22] Filed: Jul. 2, 1996

[30] Foreign Application Priority Data

Jul. 3, 1995 [JP] Japan .................................... 7-167410

[51] Int. Cl.⁶ ............................. G03F 9/00; G03C 5/02
[52] U.S. Cl. ............................ 430/4; 430/15; 430/30; 430/396; 428/192; 428/195; 428/199; 428/212; 428/220
[58] Field of Search ............................. 430/4, 5, 15, 30, 430/396; 428/192, 195, 199, 212, 218, 220, 411.1, 913

[56] References Cited

U.S. PATENT DOCUMENTS

| | | | |
|---|---|---|---|
| 2,286,779 | 6/1942 | Yule | 430/30 X |
| 3,552,288 | 1/1971 | Corley | 430/30 X |
| 5,001,512 | 3/1991 | Kubota | 355/38 |
| 5,426,010 | 6/1995 | Morton | 430/22 |

*Primary Examiner*—Bernard Codd
*Attorney, Agent, or Firm*—Sughrue, Mion, Zinn, Macpeak & Seas, PLLC

[57] ABSTRACT

A control negative for use in setting up exposure conditions for three colors in a photo-printer contains a mosaic pattern in a frame. The mosaic pattern is constituted of a plurality of segments of different densities and sizes. The segments are arranged such that the same area transmittance density can be obtained when density values are measured from different areas of the frame. The control negative is useful for different type photo-printers having different photometric areas for measuring the area transmittance density of the control negative.

10 Claims, 8 Drawing Sheets

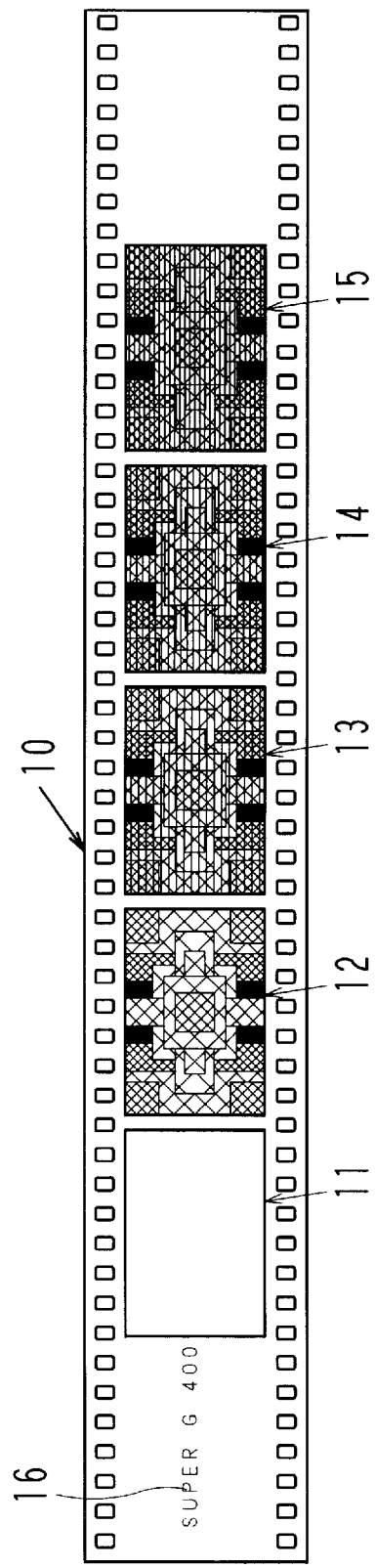
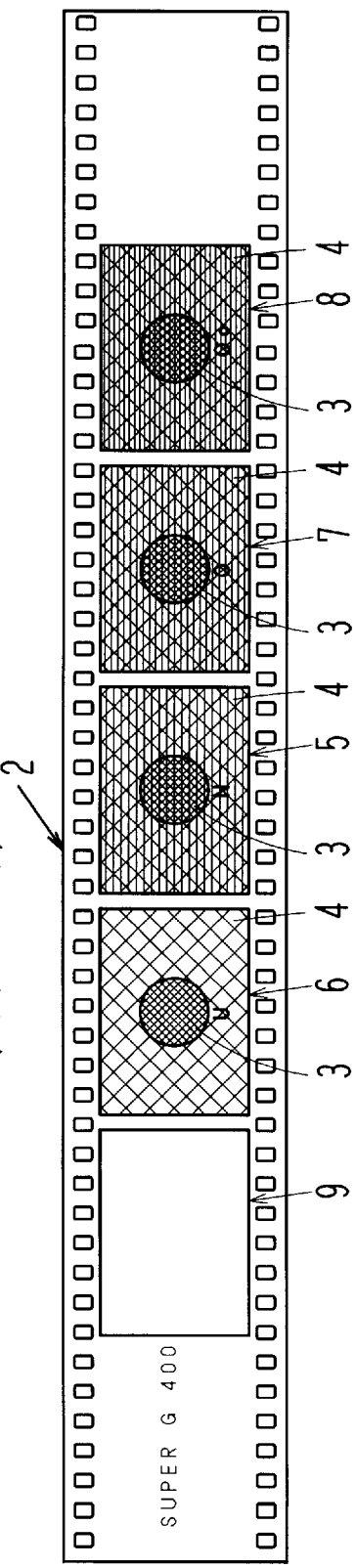

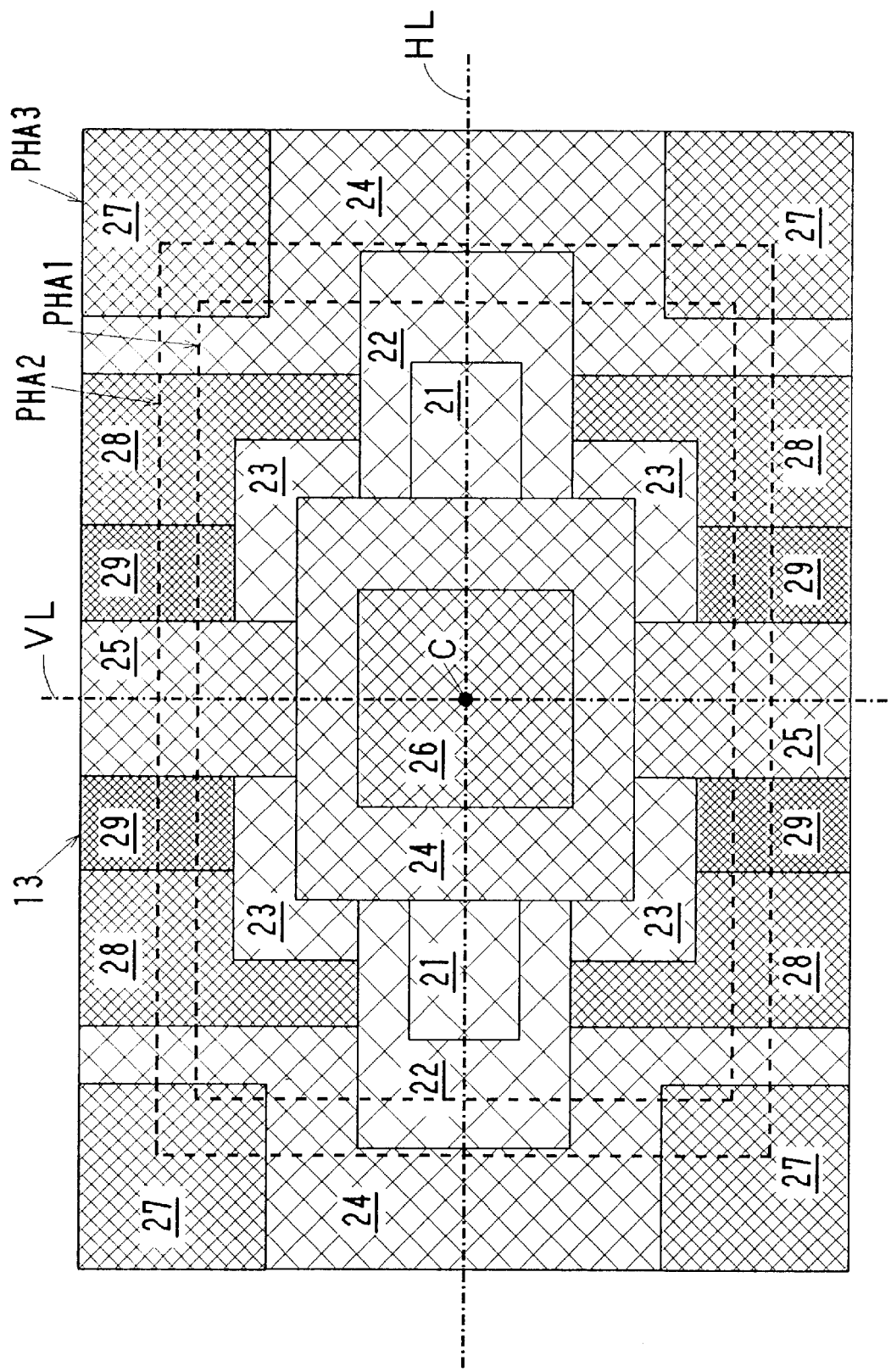

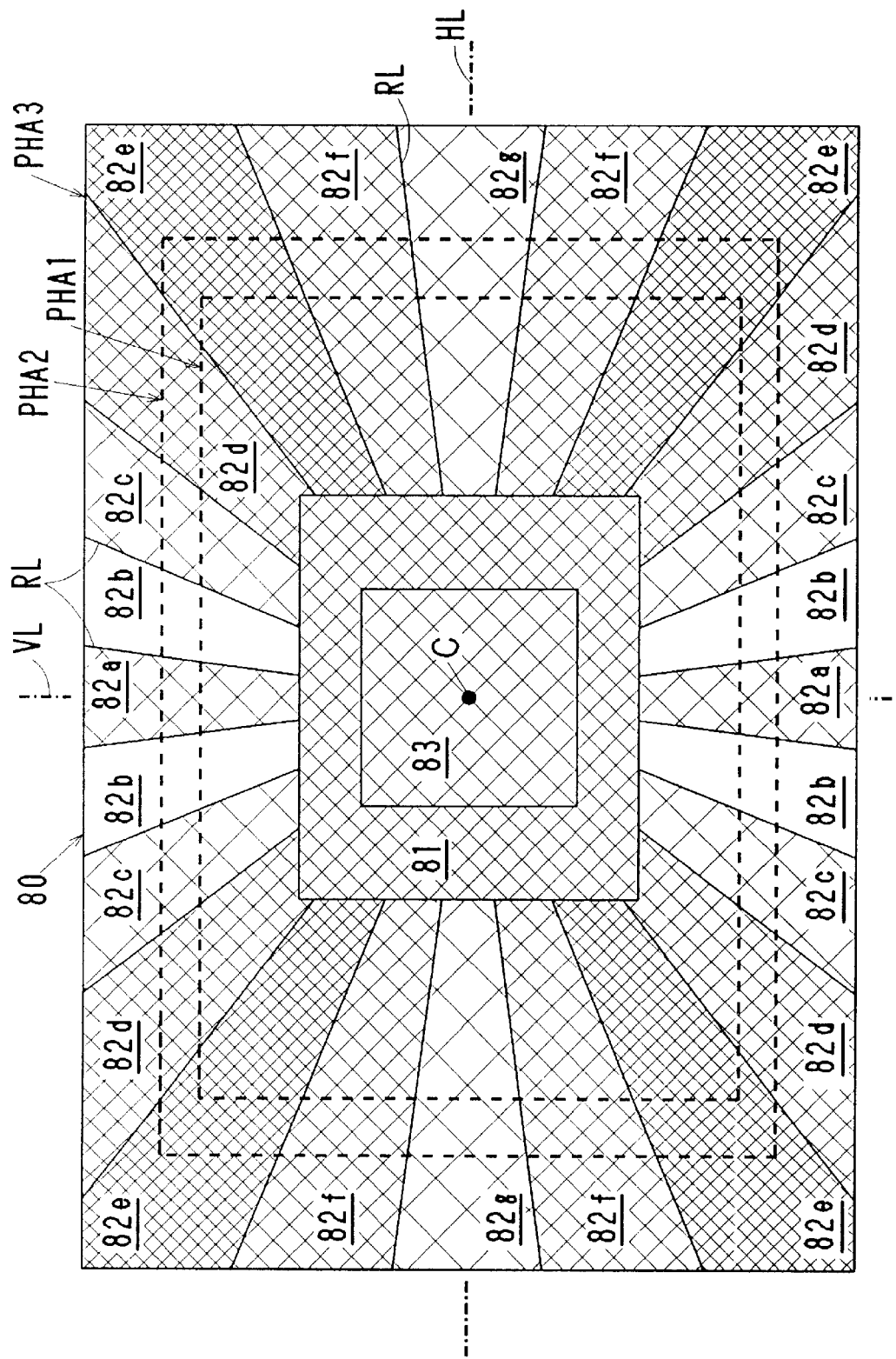

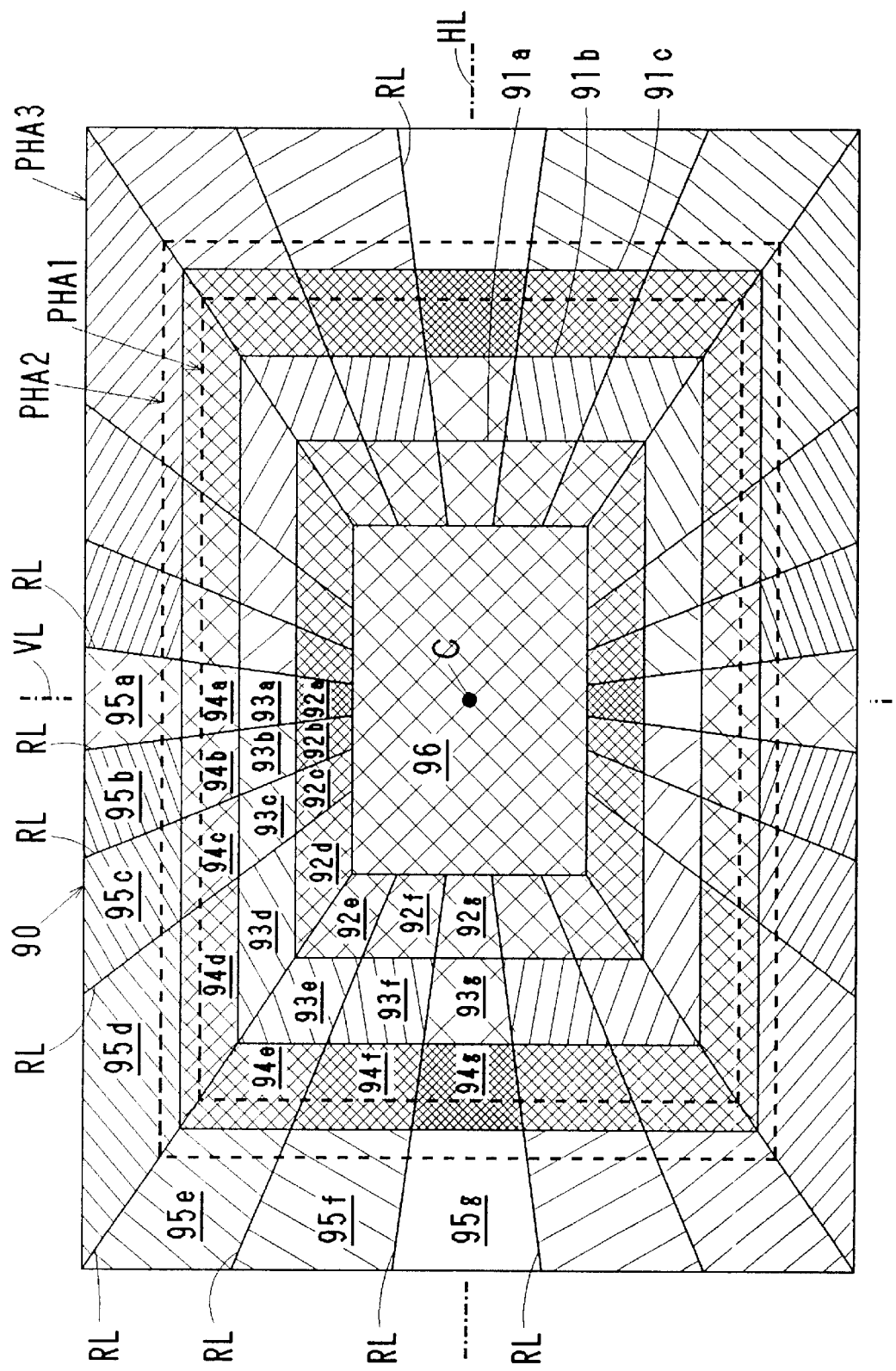

CONTROL NEGATIVE FOR USE IN SETTING UP EXPOSURE CONDITION OF PHOTO-PRINTER

BACKGROUND OF THE INVENTION

1. Field of the Invention

The present invention relates to a control negative for use in setting a photo-printer to proper exposure conditions, prior to actual printing. More particularly, the present invention relates to a general control negative which is applicable to any kind of photo-printer for setting up proper exposure conditions.

2. Background Art

An automatic photo-printer determines an appropriate print-exposure in accordance with three color densities of a negative to be printed, which are measured by an image scanner such as a CCD scanner mounted in the photo-printer. To achieve a homogeneous image quality, it is desirable to check, prior to actual printing, the exposure conditions for three colors, to set up the photo-printer to proper exposure conditions, because the exposure conditions can change according to the photo-printer type or changes in properties of the same photo-printer, or according to a difference in color characteristics among color papers used for printing.

For setting up proper exposure conditions for three colors in the photo-printer, first a sample print is made from a control negative (or called a set-up negative), without effecting any exposure correction to the photo-printer. Next, densities of three colors, such as yellow, magenta and cyan, of the sample print are measured by a density measurement device. Then, three color densities of a previously provided reference print made from the control negative under optimum exposure conditions are also measured by the density measurement device. Then, a difference in density between the sample print and the reference print is detected color by color. According to the difference in each color density, an exposure correction value is determined for any one of the three colors, and is entered through correction keys. In this way, the photo-printer is set to proper exposure conditions where a print made from the control negative would have the same density and color balance as the reference print. The density measurement device is usually incorporated in the photo-printer, to measure three color densities from a predetermined central area of the sample print or the reference print.

Generally, most original frames expected to be printed have been photographed under daylight, i.e., sunlight from 10 a.m. to 2 p.m., or under similar exposure conditions, at proper exposure values determined based on the film speed, so that most negatives have proper image densities. In addition, it is usual that a human subject occupies about one-third of the entire area of each negative frame, while the remaining area, i.e. the background is occupied by landscapes such as trees, sky, walls and so forth. In principle, a mixture of three color transmittance densities of all pixels of a properly exposed negative results in a neutral gray.

Therefore, as a representative of such ordinary negatives, conventional control negative kit 2 contains a round eye portion 3 in a center of the frame, which is designed to be printed as a neutral gray circle in the reference print. And a background 4 of a different color density surrounds the eye portion 3, as is shown in FIG. 9. Control negative frames 5 to 8 are photographed from the same original at different exposure values. The frame 5 is photographed at a normal exposure value, so is called a normal exposed frame. The frame 6 is photographed at an insufficient exposure value, so is called an under-exposed frame. The frame 7 is photographed at an excessive exposure value, so is called an over-exposed frame. The frame 8 is photographed at a greatly excessive exposure value, so is called a super over-exposed frame. The normal exposed frame 5 represents a standard original frame to be printed. Besides these control negative frames 5 to 8, there is provided a blank frame 9 with no image on the control negative kit 2 to show a basic density of the filmstrip used for the control negative kit 2.

First, a sample print is made from the normal exposed frame 5 by measuring an average transmittance density within a photometric area, so-called LATD (large area transmittance density), of the normal exposed frame 5 through a photometric device such as a CCD image scanner. The photometric area covered by the image scanner varies depending upon the type of photo-printers. For example, three types photo-printers "COMPACT", "ROCKY" and "FAP3500" (trade names) produced by Fuji Photo Film Co., Ltd., have different photometric areas, i.e., 49%, 64% and 100% of the entire area of the full-size frame of the 135-size film, respectively. Accordingly, with the same control negative kit 2, the area ratio of the eye portion 3 to the background 4 within the photometric area would change between the different types of photo-printers. So the consequent photometric value, i.e. the average transmittance density within the photometric area, would change according to the change in area ratio of the eye portion 3 to the background 4 within the photometric area.

To avoid this problem, it is possible to provide a specific control negative kit to each photo-printer type by changing the size or the density of the eye portion 3 according to the respective photo-printer types. But this solution is obviously inefficient, and results in complicated management of the control negative kit.

SUMMARY OF THE INVENTION

In view of the foregoing, a prime object of the present invention is to provide a control negative from which the same photometric result can be obtained independently of the difference between photometric areas that are used for measurement of the density of the control negative. Namely, the present invention is to provide a control negative which is applicable to any type of photo-printer for setting proper exposure conditions.

Another object of the present invention is to provide a control negative which permits visual inspection of a consequent photo-print on determining whether exposure conditions in a photo-printer are proper or not.

According to the present invention, a control negative for use in setting up exposure conditions for three colors in a photo-printer contains a mosaic pattern in a frame, which consists of a plurality of segments of different densities and sizes. The segments are arranged such that the same area average density can be obtained when density values are measured from different areas of the frame.

Adjacent ones of the segments have different densities. It is preferable to arrange the segments in groups to constitute various gray scales. This embodiment facilitates inspection of the gradation with naked eyes.

The mosaic pattern is preferably symmetrical about a center point of said frame as well as about horizontal and vertical center lines which cross at the center point.

To improve accuracy and reliability, it is preferable to determine that minimum lengths of the respective segments are at least 1.5 times longer than a shorter side of a photometric zone covered by an element of an associated photometric device. Thus, the photometric result becomes less dependent on the positioning accuracy of the control negative frame relative to the photometric device.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 1 schematically shows a control negative kit according to a preferred embodiment of the invention;

FIG. 2 is an explanatory view of a normal exposure frame of the control negative kit of FIG. 1;

FIG. 7 is an explanatory view of a normal exposure frame of the control negative kit according to a further embodiment of the invention;

FIG. 8 is an explanatory view of a normal exposure frame of the control negative kit according to still another embodiment of the invention; and FIG. 9 is an explanatory view of a conventional control negative kit.

DETAILED DESCRIPTION OF THE PREFERRED EMBODIMENTS

Figure 3:
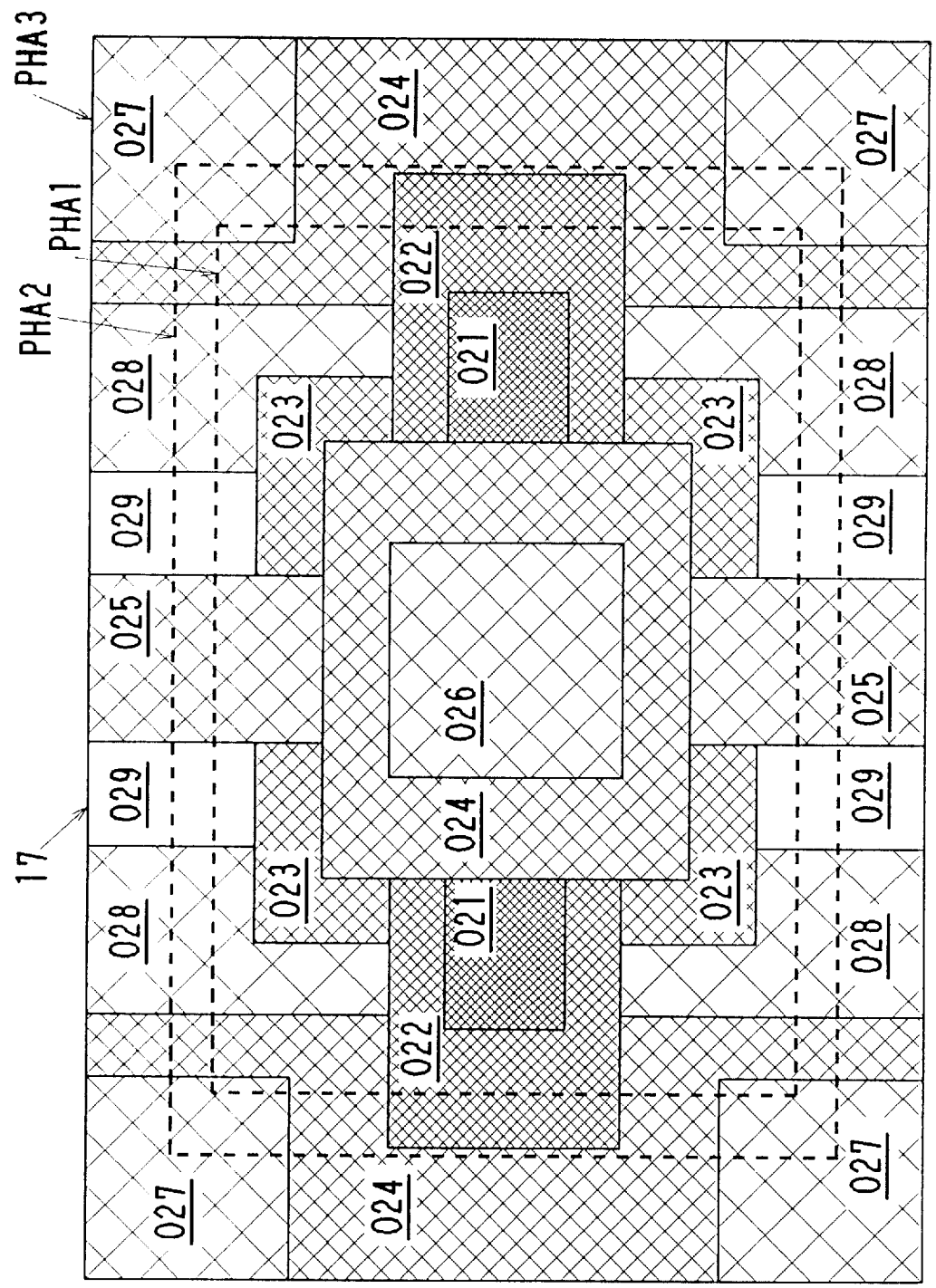
FIG. 3 is an explanatory view of the original for making the control negative kit of FIG. 1.

In FIG. 1, control negative kit 10 according to a preferred embodiment of the invention has a series of frames 12 to 15 containing the same image, which are photographed on a negative filmstrip at different exposure values, wherein the frames 12 to 15 are respectively an under-exposed frame, a normal exposure frame, an over-exposed frame, and a super over-exposed frame. There is also a blank frame 11 having no image to represent a basic density of the filmstrip. The control negative kit 10 is provided for each type of negative film. Designated by 16 is indicia indicating the type of the designated negative film. In the example shown in FIG. 1, the indicia 16 indicates that the control negative kit 10 is for "SUPER G 400" (a trade name), an ISO 400 type 135-size negative film produced by Fuji Photo Film Co., Ltd.

As shown with respect to the normal exposure frame 13 in FIG. 2, the image contained in the frames 12 to 15 of the control negative kit 10 is a mosaic pattern constituted of various segments 21 to 29 having various densities and shapes, wherein the same reference numeral is assigned to those segments which have the same three color densities Di (i=21 to 29). The mosaic pattern is symmetrical about a center point C of the frame 12 to 15, and about a vertical center line VL and a horizontal center line HL which cross at the center point C. Densities, sizes and arrangement of the respective segments 21 to 29 are determined such that the same photometric result can be obtained even from different photometric areas of different types of photo-printers.

Specifically, since the normal exposure frame 13 should represent a typical or average negative image to be printed whose subject brightness distribution approximates a normal distribution with an average brightness in the center. Therefore, the density distribution of the normal exposure frame is determined with reference to a density histogram which represents densities of respective pixels of the normal exposure frame along the X-axis, and numbers or frequency of those pixels having the same density along the Y-axis. With reference to the density histogram, densities, sizes and arrangement of the respective segments 21 to 29 are determined on a personal computer by use of a data base software, such that the same result can be obtained when the photometric data is detected from different photometric areas PHA1, PHA2 and PHA3. For example, the photometric areas PHA1, PHA2 and PHA3 are 49%, 64% and 100% of the entire area of the frame 13, respectively, which correspond to photometric areas of the above-described Fuji's three photo-printer types "COMPACT", "ROCKY" and "FAP3500".

FIG. 3 shows a positive mosaic pattern 17 used as an original for making the frames 12 to 13 of the control negative kit 10. The normal exposure frame 13 is provided by photographing the positive mosaic pattern 17 on a negative filmstrip at a proper exposure value in a specific camera or the like. Mosaic elements of the original mosaic pattern 17 are designated by reference numerals 021, 022, 023, 024, 025, 026, 027, 028 and 029 in correspondence with the segments 21 to 29 of the normal exposure frame 13, respectively. That is, the mosaic element 012 of the original mosaic pattern 17 corresponds to the segment 21 of the normal exposure frame 13, but is reversed in the order of density. For example, neutral gray density D0i (i=21 to 29) of the mosaic elements 012 to 029 are as follows: D021=1.6, D022=1.4, D023=1.2, D024=1.0, D025=0.9, D026=0.8, D027=0.7, D028=0.6, D029=0.4.

For example, on the film type "SUPER G 400", the three color densities Di of the segments 21 to 29 of the normal exposure frame 13 are as follows:

D21: C(cyan)=0.5, M(magenta)=0.9, Y(yellow)=1.1
D22: C=0.6, M=1.1, Y=1.3
D23: C=0.7, M=1.2, Y=1.4
D24: C=0.9, M=1.3, Y=1.5
D25: C=1.0, M=1.4, Y=1.6
D26: C=1.1, M=1.4, Y=1.7
D27: C=1.1, M=1.5, Y=1.7
D28: C=1.1, M=1.6, Y=1.8
D29: C=1.2, M=1.7, Y=1.9

The respective segments 21 to 29 of the mosaic pattern on the control negative kit 10 are designed to have minimum lengths of not less than 1.5 mm, when a photometric zone covered by each photosensitive element of the image scanner is 1 mm in width. That is, the minimum lengths of the respective segments 21 to 29 are preferably at least 1.5 times longer than the width or shorter length of the photometric zone, and more preferably at least twice the width of the photometric zone. Below this range, a deviation of the control negative kit 10 from a predetermined density measuring position could adversely affect the photometric result of the image scanner. However, if the individual segments 21 to 29 are too large, the mosaic pattern could not provide the above-described effect. Therefore, as for 135-size film, maximum lengths of the respective segments 21 to 29 are preferably not more than 6 mm, more preferably not more than 3 mm, and most preferably not more than 2.5 mm.

A reference print is made by printing the normal exposure frame 13 under optimum exposure conditions. That is, from the normal exposure frame 13 whose segments 21 to 29 have the above described three color densities, a reference print is finished so that a center segment thereof that corresponds to the center segment 26 of the normal exposure frame 13 will have a neutral gray density of about 0.7, which may vary from 0.6 to 0.8 depending upon the type of photo-printer.

Figure 4:
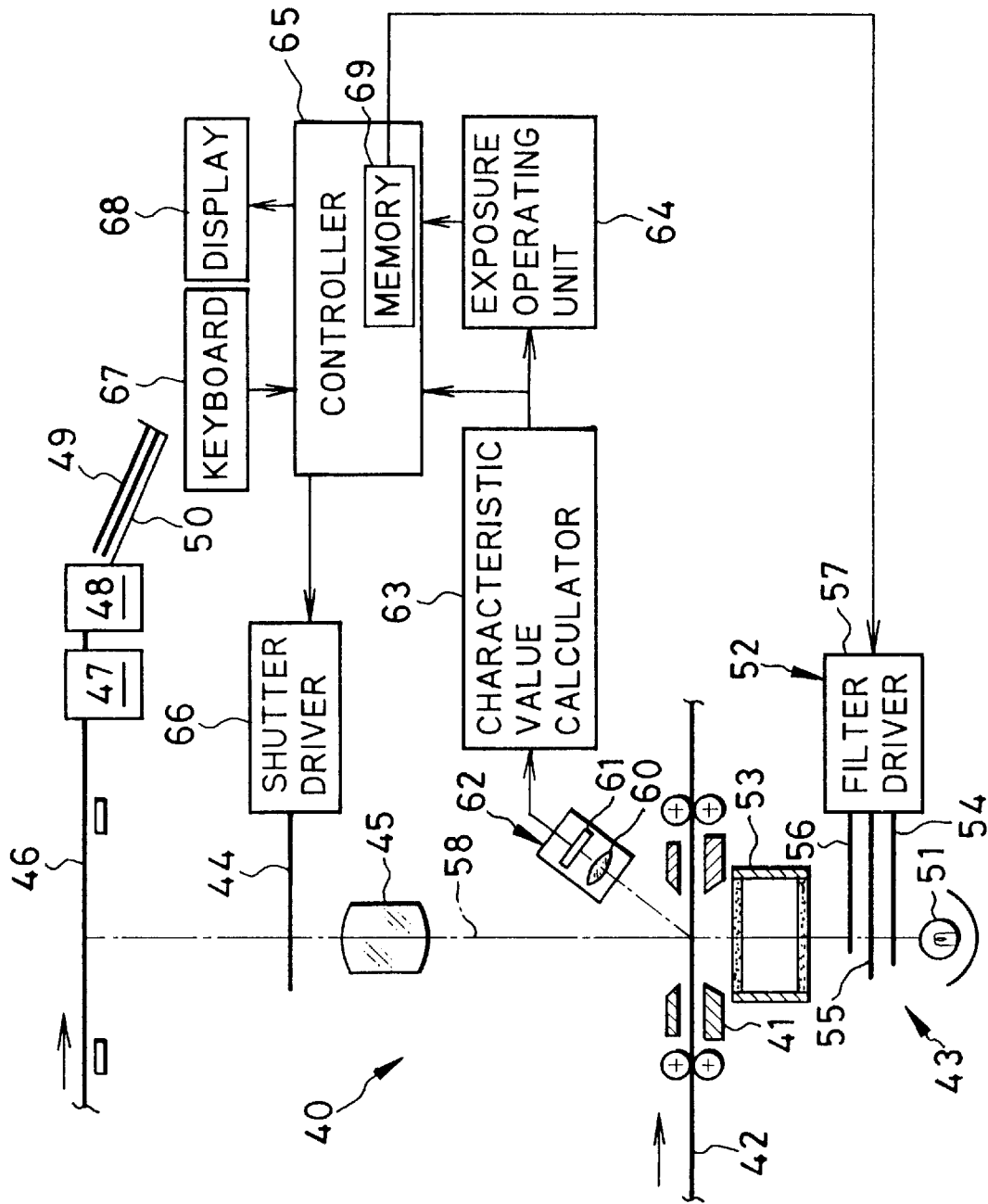
FIG. 4 schematically shows the overall construction of a photo-printer.

FIG. 4 shows a conventional photo-printer 40 with a paper processing section, called printer-processor. In the photo-printer 40, a negative film 42 is intermittently transported through a film carrier 41 so as to place a frame to be printed in a printing position in the film carrier 41. The frame placed in the printing position is illuminated by a light source 43. While a shutter 44 is open, light bundles passing through the frame are focused through a printing lens 45 onto a photographic color paper 46 to print an image of the frame on the color paper 46. The color paper 46 is temporarily stored in a reserving portion 47, and then subjected to a photofinishing process in a paper processor 48. The finished color paper 46 is cut into individual pieces of photo-prints 49, which are ejected to a tray 50.

The light source 43 is constituted of a lamp 51, a light control section 52 and a mixing box 53. The light control section 52 controls color balance and intensity of light by adjusting the amount of insertion of each of cyan, magenta and yellow filters 54, 55 and 56 into a printing light path 58 through a filter driver 57.

An image scanner 62 constituted of a lens 60 and a color image sensor 61 is disposed to face the frame placed in the printing position. The scanner 62 measures three color separation densities of respective pixels of the frame to be printed. The measured density values are sent to a characteristic value calculator 63 to derive characteristic values such as the LATD, the lowest density, the highest density and so forth. Also, the characteristic value calculator 63 makes a conventional scene-classification by use of the three color separation densities, and calculates exposure correction values according to a formula predetermined for each class of the scenes. The characteristic values and the exposure correction values are sent to an exposure operating unit 64, which then calculates a print-exposure from these values according to a conventional formula. The print-exposure is sent to a controller 65.

The controller 65 may be a well-known microcomputer, and sequentially controls respective portions of the photo-printer 40. The controller 65 determines the insertion amounts of the three color filters 54 to 56 based on the print-exposure, and controls the filter driver 57 of the light control section 52 correspondingly. The controller 65 controls a shutter driver 66 to open the shutter 44 for a determined time. Thus, an image of the frame placed in the printing position is formed through the printing lens 45 onto the color paper 46 for a proper exposure time. A keyboard 67 and a display 68 are connected to the controller 65, so as to permit manual switching of printer-modes and entering commands or data.

Figure 5:
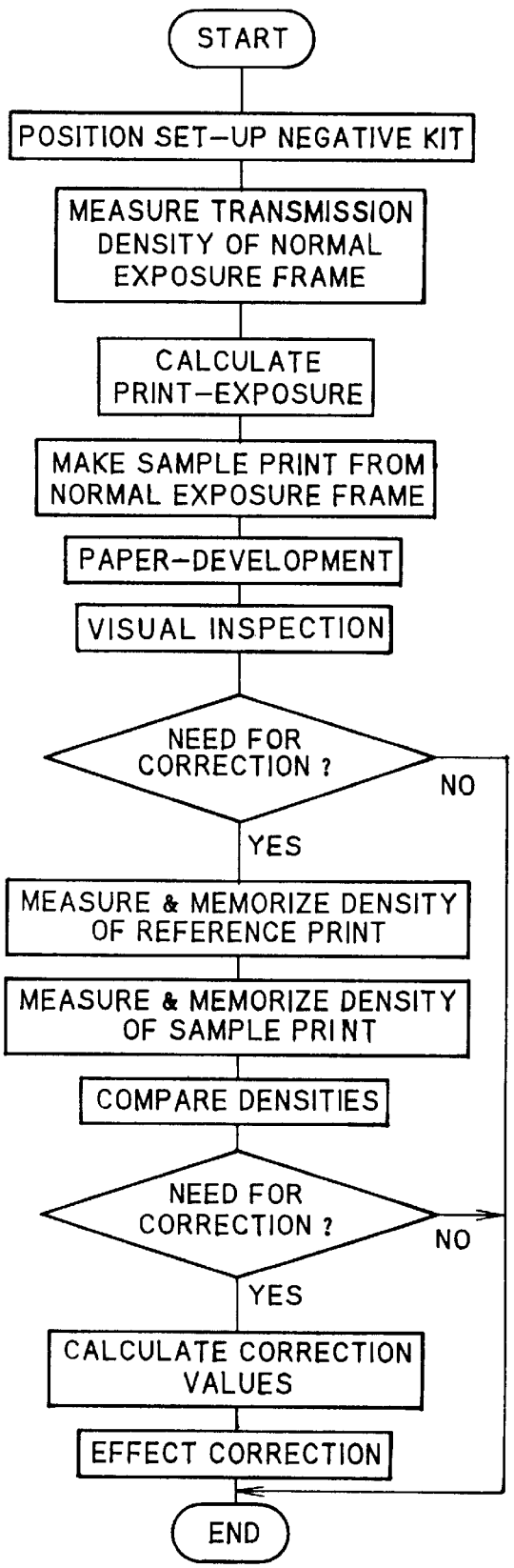
FIG. 5 is a flow chart illustrating a sequence of setting up exposure conditions for three colors in the photo-printer.

When setting up exposure conditions for three colors in the photo-printer 40 by use of the control negative kit 10, the operator sets the controller 65 to an exposure condition set-up mode through the keyboard 67. Then, the controller 65 starts setting up exposure conditions according to a sequence shown in FIG. 5. In the exposure condition set-up mode, there are "master balance set-up mode", "paper balance set-up mode" and "lens board balance set-up mode". The master balance set-up mode is for routinely checking and correcting three color balances of the photo-printer itself. The paper balance set-up mode is for checking and correcting three color balances according to the type of photographic paper 46. The lens board balance set-up mode is for checking and correcting three color balances when the printing lens 45 is changed.

First, the control negative kit 10 is inserted in the film carrier 41 to place the normal exposure frame 13 in the printing position. Next, an area transmittance density of the normal exposure frame 13 is measured for each color by the scanner 62 without effecting the scene-classification and corresponding exposure correction. The photometric area measured by the scanner 62 varies depending upon the type of the photo-printer 40. For example, one of the photometric areas PHA1, PHA2 and PHA3, which are respectively 46%, 64% and 100% of the entire area of the normal exposure frame 13, is used for this density measurement. However, because the densities, sizes and arrangement of the respective segments 21 to 29 are determined such that the same photometric result, i.e. the same area transmittance density, can be obtained even from the different photometric areas PHA1, PHA2 and PHA3, the control negative kit 10 is commonly useful for these different photometric areas.

The area transmittance density of the normal exposure frame 13 is calculated for each color in the characteristic value calculator 63, and is sent to the exposure operating unit 64. The exposure operating unit 64 calculates a print-exposure from the area transmittance densities of three colors, and sends it to the controller 65. The controller 65 determines the insertion amounts of the three color filters 54, 55 and 56 based on the print-exposure, and controls the light control section 52 correspondingly. When calculating the print-exposure, no exposure correction according to the scene-classification is effected. Thereafter, the shutter 44 is opened for a given time to print the image of the normal exposure frame 13 on the color paper 46. The printed image is developed and finished in the paper processor 48, providing a sample print.

The operator inspects the gradation of the sample print with naked eyes. Concretely, if the borders between four adjacent segments 23, 25, 28 and 29 are definite, the operator can judge that the photo-printer 40 is in proper exposure conditions. In that case, the next process, i.e., density measurement of the sample print and the reference print, and color balance correction may be omitted. If, on the contrary, any of the borders is indefinite or vague, it is necessary to correct the color balance. Then, the densities of the reference print and the sample print should be measured.

First, an instruction to measure the density of the reference print is displayed on the display 68. Upon operating a measurement start key after positioning the reference print in a density measuring device which is attached to the photo-printer, three color densities are measured from a center area of the reference print. The three color densities are displayed on the display 68 and, simultaneously, memorized in a memory 69 of the controller 65.

Next, an instruction to measure the density of the sample print is displayed on the display 68. The sample print is then placed in the density measuring device to measure and memorize three color densities of the sample print, which are also displayed on the display 68.

The controller 65 compares the densities of the reference print with those of the sample print, and the differences in three color densities are displayed. If any of the differences is above a predetermined value, the operator enters a correction command through the keyboard 67, whereupon the controller 65 calculates correction values and corrects a master balance value with the correction values when it is in the master balance set-up mode. In the paper balance set-up mode or the lens board balance set-up mode, a paper balance value or a lens board balance value is corrected respectively in the same way as for the master balance value. The master balance value, the paper balance value, and the lens board balance value are stored in the exposure operating unit 64.

Other frames 11, 12, 14 and 15 of the control negative kit 10 are used for detecting a ratio of change in density of each color relative to the change of exposure values. Based on the detected ratio, an exposure correction coefficient is determined for each color, in a conventional manner.

The densities, sizes and arrangement of the segments 21 to 29 are not limited to the embodiment shown in FIG. 2, but may be modified appropriately so far as the same photometric result, i.e., the same area average density for each color, can be obtained independently of the photometric area.

Figure 6:
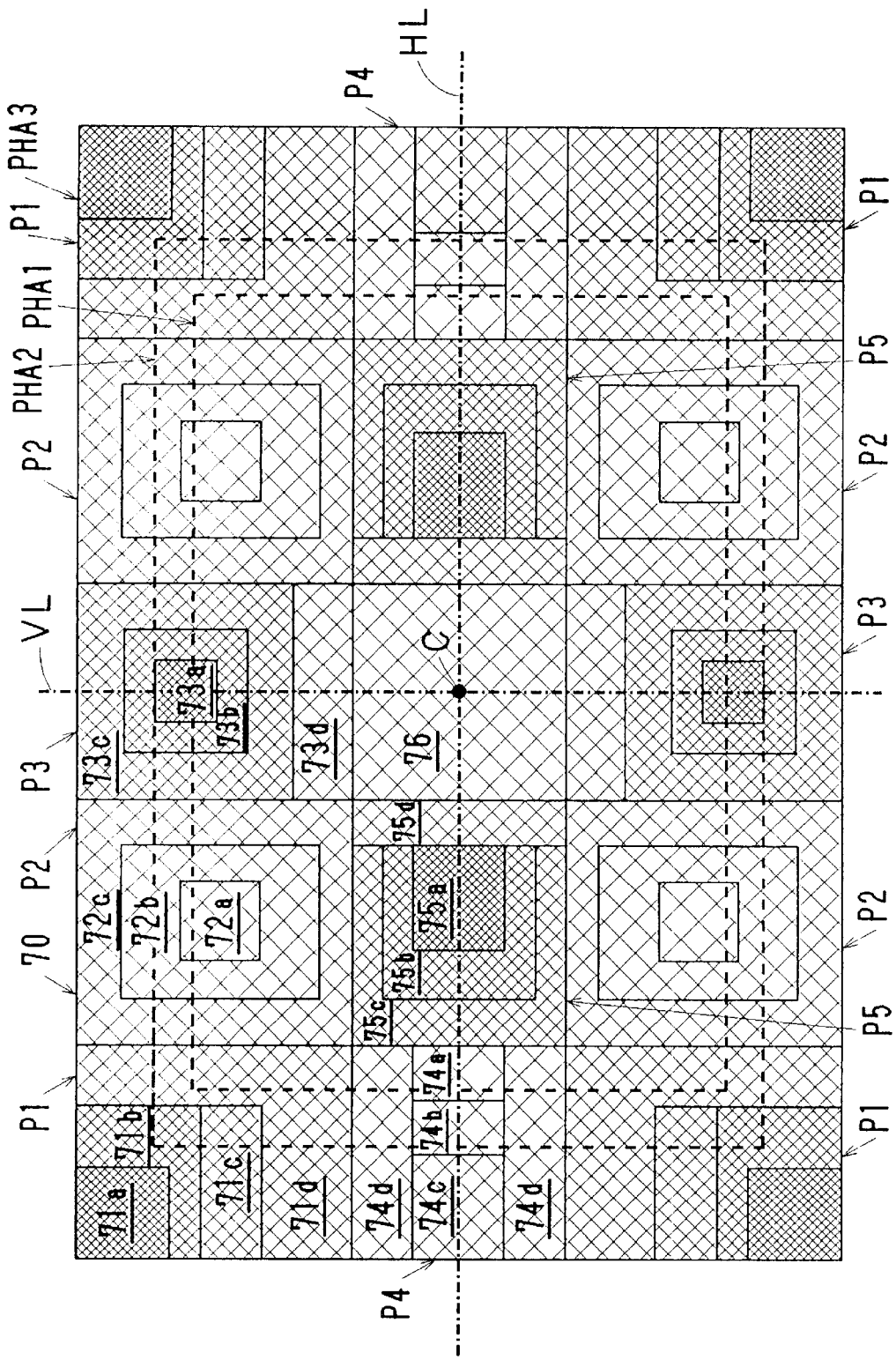
FIG. 6 is an explanatory view of a normal exposure frame of control negative kit according to another embodiment of the invention.

FIG. 6 shows a normal exposure frame 70 of a control negative kit according to another embodiment. The normal exposure frame 76 contains a mosaic pattern constituted of given groups of segments 71a to 71d, 72a to 72c, 73a to 73d, 74a to 74d, and 75a to 75d, and a center square segment 76 which is disposed in the center of the frame 70 coaxial with the center point C of the frame 70. The center segment 76 is neutral gray corresponding to the eye portion 3 of the conventional control negative kit 2. Each segment group has three or four kinds of segments of different densities, which are arranged adjacent to each other. Thus, the respective segment groups 71a to 71d, 72a to 72c, 73a to 73d, 74a to 74d, and 75a to 75d constitute five variations of gray scales P1, P2, P3, P4 and P5. Also, the densities of those segments disposed in the borders between the segment groups are different from those of the adjacent ones. In total, the mosaic pattern of this embodiment is also symmetrical about the center point C as well as the vertical center line VL and the horizontal center line HL of the frame 70.

The densities, sizes and arrangement of the respective segments 71a to 71d, 72a to 72c, 73a to 73d, 74a to 74d, and 75a to 75d are determined such that the same photometric result can be obtained even when the photometric data is detected from the different photometric areas PHA1, PHA2 and PHA3. In addition, because of the five variations of gray scales P1, P2, P3, P4 and P5, a sample print made from the normal exposure frame 70 is easy to inspect the gradation with naked eyes, improving reliability of the visual inspection.

FIG. 7 shows another embodiment of mosaic pattern for a control negative 80, wherein seven kinds of segments 82a to 82g of different densities are arranged radially around two coaxial rectangular segments 81 and 83, such that the mosaic pattern is symmetrical about the center point C of the control negative frame 80 as well as about the horizontal and vertical center lines HL and VL. The rectangular segments 81 and 83 are coaxial with the center point C. The center segment 83 is neutral gray corresponding to the eye portion 3 of the conventional control negative kit 2. Arrangement of the segments 82a to 82g along radial lines RL of the center point C permits obtaining the same area average density of each color from any other photometric areas than the predetermined photometric areas PHA1, PHA2 and PHA3, so far as they are coaxial with the center point C.

In an embodiment shown in FIG. 8, a set-up negative frame 90 has a mosaic pattern, wherein a peripheral area surrounding a center rectangular segment 96 is divided not only along radial lines RL of the center point C of the frame 90, but also along three rectangular lines 91a to 91c, which are coaxial with the center point C and have corresponding shapes to the center segment 96 as well as to the frame 90. Thus, four circles of parallelogram segments 92a to 92g, 93a to 93g, 94a to 94g, and 95a to 95g coaxially surround the center segment 96. Seven adjacent segments in each circle constitute a group, such that the mosaic pattern of this frame 90 is symmetrical about the center point C as well as about the vertical and horizontal center lines VL and HL of the frame 90. Also, the densities, sizes and arrangement of these segments are determined such that adjacent ones have different densities and that the same result can be obtained from the different photometric areas PHA1, PHA2 and PHA3, or any other photometric areas if only they are coaxial with the center point C. The center segment 96 is neutral gray corresponding to the eye portion 3 of the conventional control negative kit 2.

In the conventional control negative kit 2, the gray background 4 has a magenta hue, so that the negative kit 2 may be applicable to a photo-printer which uses a green light sensor for measuring the entire area of the control negative frame. Also in the present invention, it is preferable for the same purpose to dispose mosaic segments of a magenta hue in proximity to four corners of the control negative frame. For example, the segments 27 shown in FIG. 2 preferably have a magenta hue.

The control negatives of the present invention are useful for controlling brightness and color balance of a display device such as a CRT monitor. For this purpose, the control negative is imaged on the display device, and the gradation of the displayed image, e.g. the gradation of the gray scales P1 to P5 shown in FIG. 6, is compared with a reference gray scale to adjust the image gradation to the reference gradation by operating brightness and color balance control knobs of the display device.

Although the segments of the mosaic patterns shown in the drawings are either quadrangular or polygonal, mosaic elements or segments may be triangular, circular or indeterminate form.

The above embodiments have been described in relation to the 135-size negative film. But the present invention is applicable to photographic films of any type and any size, including 110-size, 120-size and a new format photographic film which has a transparent magnetic recording layer and whose leader is able to be advanced out of its cassette shell by rotating a spool of the cassette shell.

To determine if it is necessary to correct the color balance of the photo-printer, "a round exposure method" may be applicable instead of using the density measuring device. The round exposure method is a conventional method wherein a center area of a control negative frame, e.g. a normal exposure frame, is printed in succession at different exposure conditions, e.g. nine grades of exposure conditions, onto a strip of color paper to make a series of sample prints. The operator compares the sample prints with a reference print, and inputs the serial number of the most similar sample print to the reference print into the controller of the photo-printer. Then, the controller automatically corrects the color balance with correction values predetermined in accordance with the serial number. The serial numbers of the sample prints may be printed on the back of each print.

Thus, the present invention should not be limited to the above described embodiments but, on the contrary, various modifications may be possible to those skilled in the art without departing from the scope of the appended claims.

What is claimed is:

1. A control negative for use in setting up exposure conditions for three colors in a photo-printer, comprising a frame photographed on a negative photographic film, said frame containing a geometrical and symmetrical mosaic pattern consisting of a plurality of segments of different densities and sizes, said segments being arranged geometrically and symmetrically such that the same area average density can be obtained when density values are measured from different photometric areas centered symmetrically around a center point of said frame.

2. A control negative according to claim 1, wherein adjacent ones of said segments have different densities.

3. A control negative according to claim 1 or 2, wherein said segments are arranged in groups to constitute various gray scales.

4. A control negative according to claim 1, wherein said mosaic pattern is symmetrical about the center point of said frame as well as about horizontal and vertical center lines which cross at the center point.

5. A control negative according to claim 1, wherein minimum lengths of said segments are at least 1.5 mm, and at least 1.5 times longer than a shorter side of a photometric zone covered by an element of an associated photometric device.

6. A control negative according to claim 5, wherein the negative photographic film is 135-size, and maximum lengths of said segments are more than 6 mm.

7. A control negative according to claim 5, wherein the negative photographic film is 135-size, and maximum lengths of said segments are not more than 3 mm.

8. A control negative according to claim 5, wherein the negative photographic film is 135-size, and maximum lengths of said segments are not more than 2.5 mm.

9. A control negative according to claim 1, wherein one of said segments disposed in a center area of said frame is neutral gray.

10. A control negative according to claim 9, wherein those segments which are disposed in proximity to corners of said frame have a magneta hue.

* * * * *